United States Patent
Debras et al.

(10) Patent No.: US 6,423,792 B1
(45) Date of Patent: Jul. 23, 2002

(54) PRODUCTION OF POLYETHYLENE

(75) Inventors: Guy Debras, Frasnes Lez Gosselies; Philippe Bodart, Clermont-sous-Huy, both of (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/538,250

(22) Filed: Mar. 29, 2000

(30) Foreign Application Priority Data

Mar. 29, 1999 (EP) .............................. 99106376

(51) Int. Cl.$^7$ ................. C08F 4/22; C08F 4/24
(52) U.S. Cl. .............. 526/106; 526/348; 526/352; 526/118; 526/105; 502/256; 502/319; 502/113; 502/117
(58) Field of Search ................ 526/348, 352, 526/106, 118, 105; 502/256, 319, 113, 117

(56) References Cited

U.S. PATENT DOCUMENTS 6,252,017 B1 * 6/2001 Debras et al. ............. 526/65

FOREIGN PATENT DOCUMENTS

| EP | 0166157 | | 1/1986 |
|---|---|---|---|
| EP | 0591568 | | 4/1994 |
| EP | 0 591 968 | * | 4/1994 |
| EP | 0591968 | | 4/1994 |
| EP | 0647661 | | 4/1995 |
| EP | 0 647 661 | * | 4/1995 |
| EP | 0849293 | | 6/1998 |
| WO | 9818554 | | 5/1998 |

* cited by examiner

*Primary Examiner*—David W. Wu
*Assistant Examiner*—Ling-Siu Choi
(74) *Attorney, Agent, or Firm*—William D. Jackson

(57) ABSTRACT

A process for producing a polyethylene resin having a monomodal molecular weight distribution in a single polymerisation reactor using a chromium-based catalyst system, by copolymerising ethylene and an alpha-olefinic-comonomer having from 3 to 8 carbon atoms, the polyethylene resin comprising a blend of a higher molecular weight fraction polymerised by a first chromium-based catalyst of the system and a lower molecular weight fraction polymerised by a second chromium-based catalyst of the system, wherein the comonomer incorporation in the higher molecular weight fraction is greater than the comonomer incorporation in the lower molecular weight fraction is greater than the comonomer incorporation in the lower molecular weight fraction whereby the higher and lower molecular weight fractions differ in density by from 0.01 to 0.03 g/cc.

16 Claims, 3 Drawing Sheets

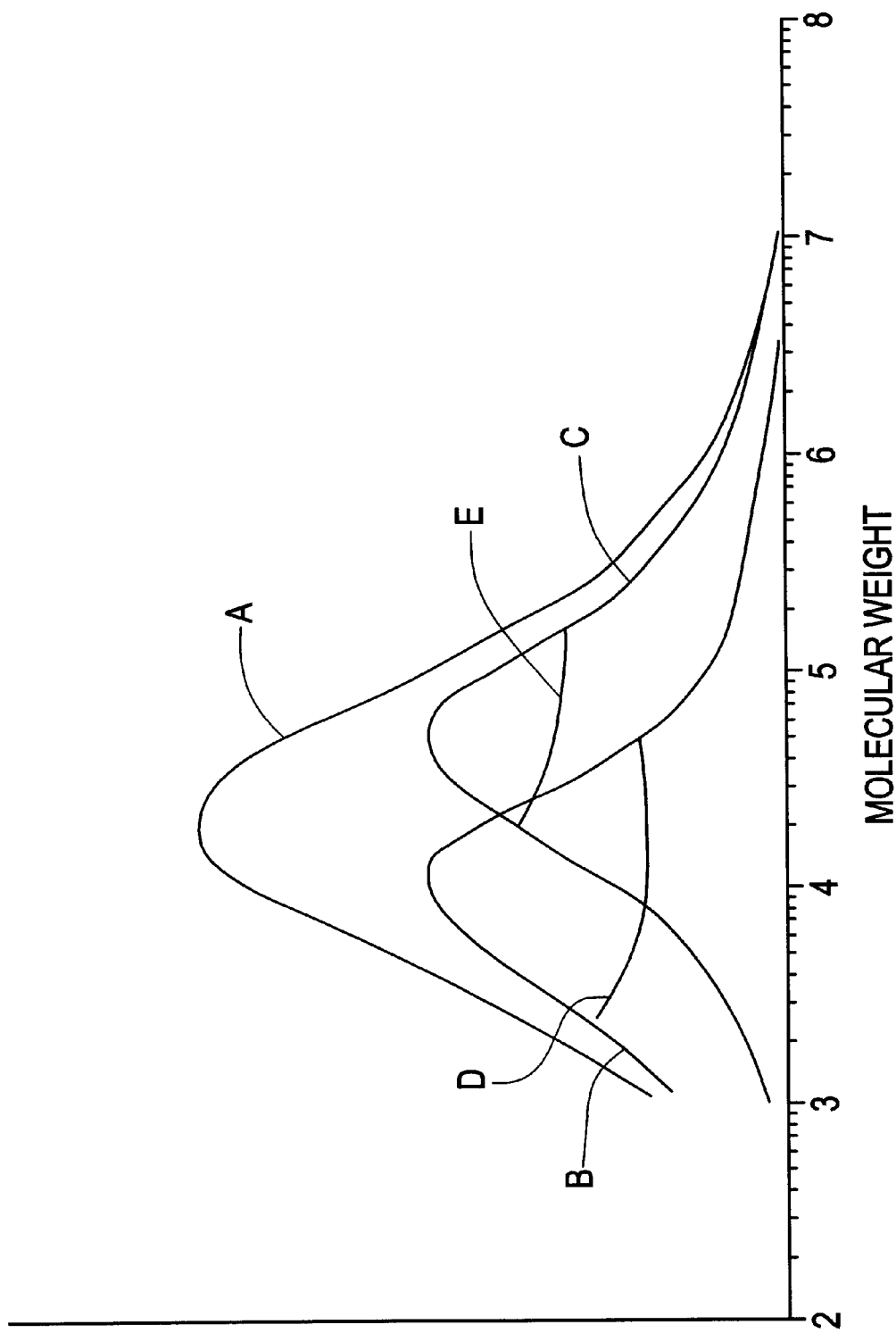

PRODUCTION OF POLYETHYLENE

BACKGROUND TO THE INVENTION

The present invention relates to a process for producing polyethylene in particular having improved mechanical properties.

DESCRIPTION OF THE PRIOR ART

Polyethylene is known for use in the manufacture of a wide variety of articles. The polyethylene polymerisation process can be varied in a number of respects to produce a wide variety of resultant polyethylene resins having different physical properties which render the various resins suitable for use in different applications. In particular, it is known to use polyethylene for use in applications where the polyethylene is required to have crack resistance, both resistance to rapid and to slow crack growth. For example, polyethylene is known for use in the manufacture of pipes where it is required that the material of the pipe has sufficient crack resistance so as to avoid inadvertent fracture in service. Polyethylene is also used for blow moulding and for the manufacture of films. For such applications the polyethylene is also required to have good mechanical properties, such as impact resistance, tear strength and environmental stress cracking resistance (ESCR).

Chromium-based catalysts used for the production of polyethylene have been known for some time. Typically, for the manufacture of polyethylene used as a pipe resin, the polyethylene is polymerised in a reactor using a chromium-based catalyst to product a monomodal molecular weight distribution of the resultant polyethylene resin.

It is known in the art that the physical properties, in particular the mechanical properties, of a polyethylene product can vary depending on what catalytic system was employed to make the polyethylene. This is because different catalyst systems tend to yield different molecular weight distributions in the polyethylene produced.

EP-A-O647661 discloses chromium catalyst compositions and polymerisation processes therewith. The catalyst compositions comprise at least two chromium catalyst systems which have different supports having different pore volumes and surface areas. It is disclosed that the resins produced are useful for film applications. The specification does not address the problem of the production of polyethylene having crack resistance for use in the manufacture of pipes.

WO-A-98/18554 discloses a process for the polymerization of alpha-olefins using an aluminophosphate support.

EP-A-0591968 discloses chromium catalyst compositions for use in polymerising olefins to produce polyethylene copolymers having good environmental stress crack resistance. Like EP-A-0647661, the chromium catalyst composition comprises at least two chromium catalyst systems having respective supports with different average pore radius. That difference is sufficient preferentially to introduce a non-ethylene comonomer into the higher molecular weight portion of the resulting copolymer. Like EP-A-0647661, EP-A-0591968 does not address the production of polyethylenes having crack resistance for use in the manufacture of pipes.

EP-A-0849293 discloses the production of polyethylene having a bimodal molecular weight distribution.

EP-A-0166157 discloses silicon and/or fluorine treated alumina for use in the production of olefin polymers having high density and ultra high molecular weight.

The present invention aims in one aspect to provide a process for producing polyethylene, in particular a polyethylene having a monomodal molecular weight distribution, having improved mechanical properties.

SUMMARY OF THE INVENTION

Accordingly, the present invention provides a process for producing a polyethylene resin having a monomodal molecular weight distribution in a single polymerisation reactor using a chromium-based catalyst system, by copolymerising ethylene and an alpha-olefinic-comonomer having from 3 to 8 carbon atoms, the polyethylene resin comprising a blend of a higher molecular weight fraction polymerised by a first chromium-based catalyst of the system and a lower molecular weight fraction polymerised by a second chromium-based catalyst of the system, wherein the comonomer incorporation in the higher molecular weight fraction is greater than the comonomer incorporation in the lower molecular weight fraction is greater than the comonomer incorporation in the lower molecular weight fraction whereby the higher and lower molecular weight fractions differ in density by from 0.01 to 0.03 g/cc.

The first and second catalysts may be differently treated portions of the same catalyst and physically blended before activation of the catalysts. Alternatively, the first and second catalysts may be different catalysts and physically blended before or after activation of the catalysts.

The present inventor has discovered surprisingly that by producing a polyethylene resin having a monomodal distribution using a single reactor but with two catalysts improved mechanical properties can be achieved by providing that the catalysts achieve greater comonomer incorporation in the higher molecular weight fraction than in the lower molecular weight fraction.

BRIEF DESCRIPTION OF THE DRAWINGS

Embodiments of the present invention will now be described by way of example only with reference to the accompanying drawings, in which:

FIG. 3 is a gel permeation chromatograph of a monomodal polyethylene resin produced in accordance with the invention.

DETAILED DESCRIPTION OF THE PREFERRED EMBODIMENTS

Figure 1:
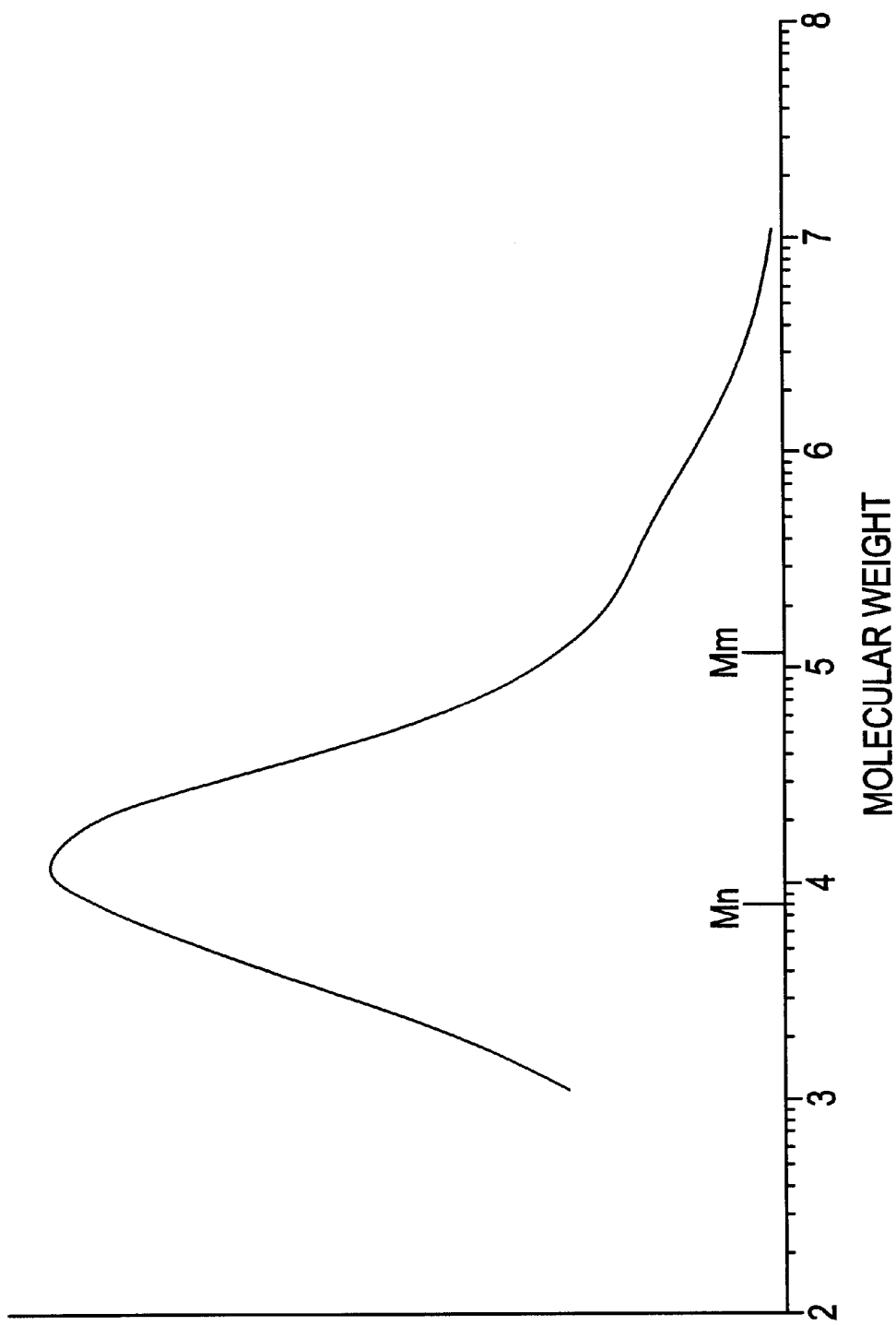
FIGS. 1 and 2 are each gel permeation chromatographs of respective polyethylene resins using different catalysts for blending to produce a catalyst system for use in the present invention.

In accordance with the invention, a monomodal polyethylene resin is produced in one reactor using a pair of chromium-based catalysts forming a composite catalyst system. The pair of catalysts is selected so that one catalyst of the pair produces a higher molecular weight fraction of the monomodal polyethylene resin and the other catalyst of the pair produces a lower molecular weight fraction thereof. Moreover, the catalysts of the pair are selected so that the catalyst producing the high molecular weight fraction also incorporates a greater amount of comonomer into that fraction than the amount of comonomer incorporated into the lower molecular weight fraction by the other catalyst of the pair. In this way, in the resultant resin, which has a monomodal molecular weight distribution resulting from the combined molecular weight distributions of the two fractions, there is a high level of comonomer incorporation in the high molecular weight part. Thus the higher and lower molecular weight fractions produce respectively lower and higher density fractions in the ultimate polyethylene resin. The high molecular weight fraction can have a relatively narrow molecular weight distribution compared to that of the lower molecular weight fraction. There is a separation between the peaks of the higher and lower molecular weight distributions, although the combined distribution is monomodal. This in turn leads to improved mechanical properties of the resultant resin.

In one preferred embodiment, the chromium-based catalyst system comprises a physical blend of two chromium-based catalysts which have been blended before activation. The two catalysts are essentially the same catalysts, but one catalyst has been pretreated, for example by fluorination, in such a way as to alter the degree of comonomer incorporation in the fraction produced by that catalyst. For example, the catalyst system may comprise as a first chromium-based catalyst of the system, a fluorinated version of a chromium-based catalyst having a high degree of comonomer incorporation in a higher molecular fraction having a narrow molecular weight distribution, and an unfluorinated version of the same catalyst which would tend to produce a lower molecular weight fraction having a lower degree of comonomer incorporation. In order to decrease the molecular weight the second catalyst can be modified, e.g. by titanation.

Preferably in this embodiment each of the two chromium-based catalysts comprises a supported chromium oxide catalyst having a silica-containing support, for example a silica support or a composite silica and titania support. A particularly preferred chromium-based catalyst may comprise from 0.5 to 5 wt % chromium, preferably around 1 wt % chromium, based on the weight of the chromium-containing catalyst. When the support includes titanium, the support preferably comprises at least 2 wt % titanium, preferably around 2 to 3 wt % titanium, based on the weight of the chromium containing catalyst. The untreated chromium-based catalyst may have a specific surface area of from 200 to 700 $m^2/g$, preferably from 400 to 550 $m^2/g$ and a volume porosity of greater than 2 cc/g preferably from 2 to 3 cc/g.

A particularly preferred chromium-based catalyst for use in this preferred embodiment of the present invention comprises a catalyst having an average pore radius of 190 A, a pore volume of around 2.1 cc/g, a specific surface area of around 510 $m^2/g$ and a chromium content of around 0.9 wt % based on the weight of the chromium-containing catalyst. The support comprises a composite silica and titania support. The amount of titania in the support provides that the catalyst as a whole comprises around 2.3 wt % titanium.

The catalyst system of this embodiment comprises a physical mixture of the catalyst in unfluorinated form and the catalyst in fluorinated form. The fluorinated form may be commercially available. Alternatively, the fluorinated form may be produced by fluorination of the unfluorinated catalyst. In a typical fluorination process, the chromium-based catalyst is impregnated with a solution of a fluorine-containing compound, such as ammonium hexafluorosilicate. Typically, from 0.5 to 2 wt % fluorine, most typically around 1 wt % fluorine, based on the weight of the chromium-based catalyst, is introduced into the catalyst.

The fluorinated version of the catalyst yields higher comonomer incorporation into the polyethylene resin and results in the production of a relatively higher molecular portion having a narrow molecular weight distribution as compared to the polyethylene fraction catalysed by the unfluorinated version of the catalyst.

The two catalysts are physically blended prior to activation in which the catalyst is subjected to an activation step in air at an elevated activation temperature. The activation temperature preferably ranges from 500 to 850° C., more preferably 600 to 750° C.

In a second preferred embodiment, the chromium-based catalyst system comprises a physical blend of two different chromium-based catalysts which have been blended before activation. In contrast to the first embodiment, the two catalysts are different catalysts. For example, the catalyst to produce the relatively low molecular weight fraction may be a chromium-based catalyst having a relatively low pore volume support and having been titanated so as to deposit titanium on the support, whereas the catalyst to produce the relatively high molecular weight fraction may be a chromium-based catalyst having a support with a relatively high pore volume. Moreover, the catalyst to produce the relatively high molecular weight fraction may have been pretreated, for example by fluorination, so as to increase the degree of comonomer incorporation in the fraction produced by that catalyst.

In this embodiment, the catalyst to produce the lower molecular weight fraction may comprise a supported chromium-oxide catalyst having a silica-containing support, for example a silica support or a composite silica and titania support. A particularly preferred chromium-based catalyst may comprise from 0.5 to 5 wt % chromium, preferably around 1 wt % chromium, based on the weight of the chromium-containing catalyst. When the support comprises titanium, the support preferably comprises at least 2 wt % titanium, preferably around 2 to 5 wt % titanium, based on the weight of the chromium-containing catalyst. The chromium-based catalyst may have a specific surface area of from 300 to 700 $m^2/g$, preferably from 300 to 500 $m^2/g$ and a volume porosity of less than 2 cc/g, preferably from 1 to 1.6 cc/g.

The first catalyst to produce the low molecular weight fraction may have been titanated prior to activation. In the titanation process, the chromium-based catalyst is introduced into an activator and titanated at a temperature of at least 150° C. but more preferably around 300° C. in an atmosphere of dry, inert gas, for example nitrogen, containing a titanium compound of the general formula selected from RnTi(OR')m and (RO)n Ti(OR')m wherein R and R' are the same or different and are a hydrocarbyl group containing from 1 to 12 carbon atoms, n is 0 to 3, m is 1 to 4 and m+n equals 4, to form a titanated chromium-based catalyst having a titanium content of from 1 to 5% by weight, more preferably from 2 to 4% by weight based on the weight of the titanated catalyst. Preferably, the titanation compound is a titanium tetraalkoxide, most preferably titanium tetraisopropoxide. Preferably, the titanation step is preceded by a dehydration step in which the catalyst is heated at a temperature of at least 300° C. in an atmosphere of dry, inert gas, preferably nitrogen, so as to remove physically adsorbed water therefrom.

After the titanation treatment, the second catalyst for producing the high molecular weight fraction is added to the activator and both catalysts are activated at a high temperature under air, for example a temperature of from 500 to 900° C., typically around 600° C.

The second catalyst in this embodiment may comprise a supported chromium-oxide catalyst having a silica-containing support, for example a silica support or a composite silica and titania support. A particularly preferred chromium-based catalyst may comprise from 0.5 to 5 wt % chromium, preferably around 1 wt % chromium, based on the weight of the chromium-containing catalyst. When the support comprises titanium, the support preferably comprises at least 2 wt % titanium, preferably around 2 to 4 wt % titanium, based on the weight of the chromium-containing catalyst. The chromium-based catalyst may have a specific surface area of from 300 to 700 m$^2$/g, preferably from 400 to 550 m$^2$/g and a volume porosity of from 1.5 to 2.5 cc/g. The second catalyst may have been modified with fluorine (as described above) prior to its introduction into the reactor.

In a third embodiment of the present invention, the catalyst comprises, as for the second embodiment, different catalysts which have additionally been differently treated after respective activation thereof in air at high temperature e.g. greater than 600° C. For example, the first catalyst may comprise a chromium-based catalyst having a low pore volume support and the second chromium-based catalyst may have a high pore volume support. Moreover, the first catalyst may comprise a support of for example aluminium phosphate (AlPO$_4$) which may have been chemically reduced (e.g. by carbon monoxide) at high temperature and re-oxidised. The second catalyst may have a silica-containing support which has been subjected to fluorination as for the first embodiment with subsequent chemical reduction, for example by carbon monoxide.

The first catalyst may be reduced or re-oxidised by the following process—the catalyst is heated to a temperature of around 850° C. and carbon monoxide in nitrogen is passed thereover for a period of 2 hours, and then the catalyst is heated in air at a temperature of 750° C. for a period of 2 hours.

The second catalyst may have been fluorinated using the process described hereinabove with respect to the first embodiment, with subsequent carbon monoxide reduction. In the carbon monoxide reduction step, the chromium-based catalyst is subjected to a chemical reduction process in which at least a portion of the chromium is reduced to a low valence state. Preferably, the chromium-based catalyst is reduced in an atmosphere of dry carbon monoxide at a temperature of from 250 to 500° C., more preferably 350 to 450° C., and most preferably at a temperature of around 370° C.

The second catalyst can be a Cr/silica, a Cr/silica-titania; or a Cr/ silica-alumina catalyst. If the support includes Ti, the Ti content may vary from 2 to 5 wt %. If the support includes alumina, the Al content may be up to 4 wt %, preferably around 2 wt %. The pore volume is typically larger than 1.5 ml/g, more preferably larger than 2 ml/g, and the surface area is typically larger than 400 m$^2$/g.

Prior to loading into the reactor, both catalysts can be precontacted with specific metal alkyl cocatalysts to further modify the melt index of each fraction and enhance comonomer incorporation.

In the polymerisation reactor, ethylene monomer and an alpha-olefinic comonomer comprising from 3 to 8 carbon atoms are fed thereinto in the liquid phase, typically in an inert diluent, preferably isobutane, together with the composite chromium-based catalyst system. Typically, the copolymerisation is performed at a temperature of from 90 to 1050° C., more typically from 95° C. to 1000° C., and at a pressure of from 20 to 60 bars, more typically around 42 bars. The comonomer preferably comprises 1-hexene, but may alternatively comprise 1-butene, 1-pentene, 4-methyl 1-pentene, 1-heptene or 1-octene or a mixture thereof.

Typically, the ethylene monomer comprises from 3 to 8% by weight and the comonomer comprises from 0.2 to 4% by weight, each based on the total weight of the monomer and comonomer in the inert diluent. A typical starting composition comprises an ethylene concentration of around 6 wt % and a 1-hexene concentration of around 1.5 wt % both in isobutane as inert diluent.

In the polymerisation reactor, polyethylene is produced by copolymerisation of the ethylene and the 1-hexene. In accordance with the preferred process, the process variables such as the ethylene and comonomer flow rate and the temperature are controlled so as to produce a polyethylene resin having a specified high load melt index (HLMI) yielding the required mechanical properties of the resin. Typically, the HLMI ranges from 2 to 40 g/10 min, and is most typically from 9 to 30 g/10 min. The melt index MI$_2$ and the high load melt index HLMI are determined using the procedures of ASTM D1238 using respective loads of 2.16 kg and 21.6 kg at a temperature of 1900° C. The HLMI is broadly inversely indicative of the molecular weight of the polymer. In other words, a low melt index is indicative of a high molecular weight for the polyethylene, and vice versa. The density of the resultant polyethylene is controlled by varying the amount of comonomer fed to the polymerisation reactor.

The resultant polyethylene resin has a monomodal molecular weight distribution.

As is known in the art, a monomodal molecular weight distribution has a single peak in the gel permeation chromatography curve of the resin. The two fractions are combined to form a composite resin having a monomodal molecular weight distribution, and the difference between the HLMI values of the two fractions is controlled so that, for any combination of resins produced in accordance with the invention, the resultant molecular weight distribution is nevertheless monomodal. The density of the two resin products produced in the first and second reactors may differ substantially, i.e. from 0.01 to 0.03 g/cc yet still providing a monomodal molecular weight distribution in the final combined resin. Such a density difference may yield improved slow crack growth resistance of the combined resin. A typical density difference is around 0.02 g/cc.

The density of the combined polyethylene is from 0.930 to 0.960 g/cc, preferably from 0.937 to 0.950 g/cc.

Without being bound by theory, it is believed that the higher degree of introduction of the comonomer into the polymer chains in the high molecular weight fraction as compared to the low molecular weight fraction leads to a change in the mechanical properties of the resultant polyethylene resin which in turn can yield an increase in the slow crack resistance and in the rapid crack propagation resistance of the polyethylene resin when used for the manufacture of pipes.

The present invention will now be described with reference to the following non-limiting Examples.

EXAMPLE 1

In this Example, two different chromium-based catalysts were physically blended, after the respective activation of each catalyst, to form a composite chromium-based catalyst system which was employed in a process to produce polyethylene resin having a monomodal molecular weight distribution.

In this Example, the composite chromium-based catalyst system comprises a first catalyst for producing a low molecular weight fraction, the first catalyst having a low degree of comonomer incorporation, which had been reduced and reoxidised, subjected to titanation and then activated at high temperatures and the second catalyst, for forming a high molecular weight fraction, had a high pore volume, had been activated a low activation temperature, had been fluorinated and then subjected to reduction by carbon monoxide. In addition, the second catalyst had been precontacted with a cocatalyst.

The first catalyst, for producing the relatively low molecular weight fraction of the composite resin, comprised an aluminium phosphate ($AlPO_4$) based chromium oxide catalyst having the pore volume, surface area, phosphorous/aluminium atomic ratio and chromium content as specified in Table 1. This catalyst ("Catalyst A") was activated in air at a temperature of around 750° C. and was thereafter subjected to a chemical reduction and reoxidation process. In the reduction step, the catalyst was chemically reduced by carbon monoxide at a temperature of around 850° C., and the catalyst was thereafter re-oxidised in air at a temperature of around 750° C.

The catalyst for producing the relatively high molecular weight fraction ("Catalyst B") comprised a chromium-based catalyst having a silica-titania support with chromium oxide deposited thereon. The catalyst had the pore volume, surface area, titanium content (on the support) and chromium content as specified in Table 1. The catalyst was activated at 650° C. in the presence of fluorine (1.4 wt % $NH_4BF_4$) to yield a fluorine content of 1 wt % based on the weight of the catalyst. Following the activation step, the catalyst was chemically reduced by dry carbon monoxide at a temperature of around 370° C.

Before catalyst A and catalyst B were combined, each catalyst was pre-contacted with a co-catalyst, which in this. Example comprised a metal alkyl. Thus catalyst A was pre-contacted with triethylboron (TEB) (4 ppm in the diluent) and catalyst B was pre-contacted with 4 ppm triisobutyl aluminium (TIBAl) (4 ppm in the diluent).

In order to demonstrate the nature of the polyethylene resin fraction produced by each of catalysts A and B, each of the two catalysts A and B were individually employed on the presence of the respective co-catalyst as specified above to produce a polyethylene resin under the respective conditions specified in Table 1. Thus catalyst A was employed to produce a polyethylene copolymer at a polymerisation temperature of around 95° C. wherein the ethylene monomer comprised 6 wt %, and the comonomer, being 1-hexene, comprised 1.5 wt %, each based on the weight of the diluent which comprised isobutane.

Catalyst B was individually employed under similar conditions and the polyethylene resins produced by the respective catalysts were recovered and the properties determined as specified in Table 1. Gel phase chromatographs for each of the two polyethylene resins recovered were measured for catalysts A and B and these are shown in FIGS. 1 and 2 respectively.

It may be seen that catalyst A produced a polyethylene resin of relatively low molecular weight (i.e. a value of Mw of around 118,000), as compared to that produced by catalyst B, (which had a value of Mw of 244,000). The density of the resin produced by catalyst B was lower than that produced by catalyst A, indicating a higher degree of comonomer incorporation into the higher molecular weight resin. The resin produced by catalyst A had a melt index $MI_2$ of 5.6 g/10 min, whereas the resin produced by catalyst B had an HLMI of 6.3 g/10 min.

Figure 2:
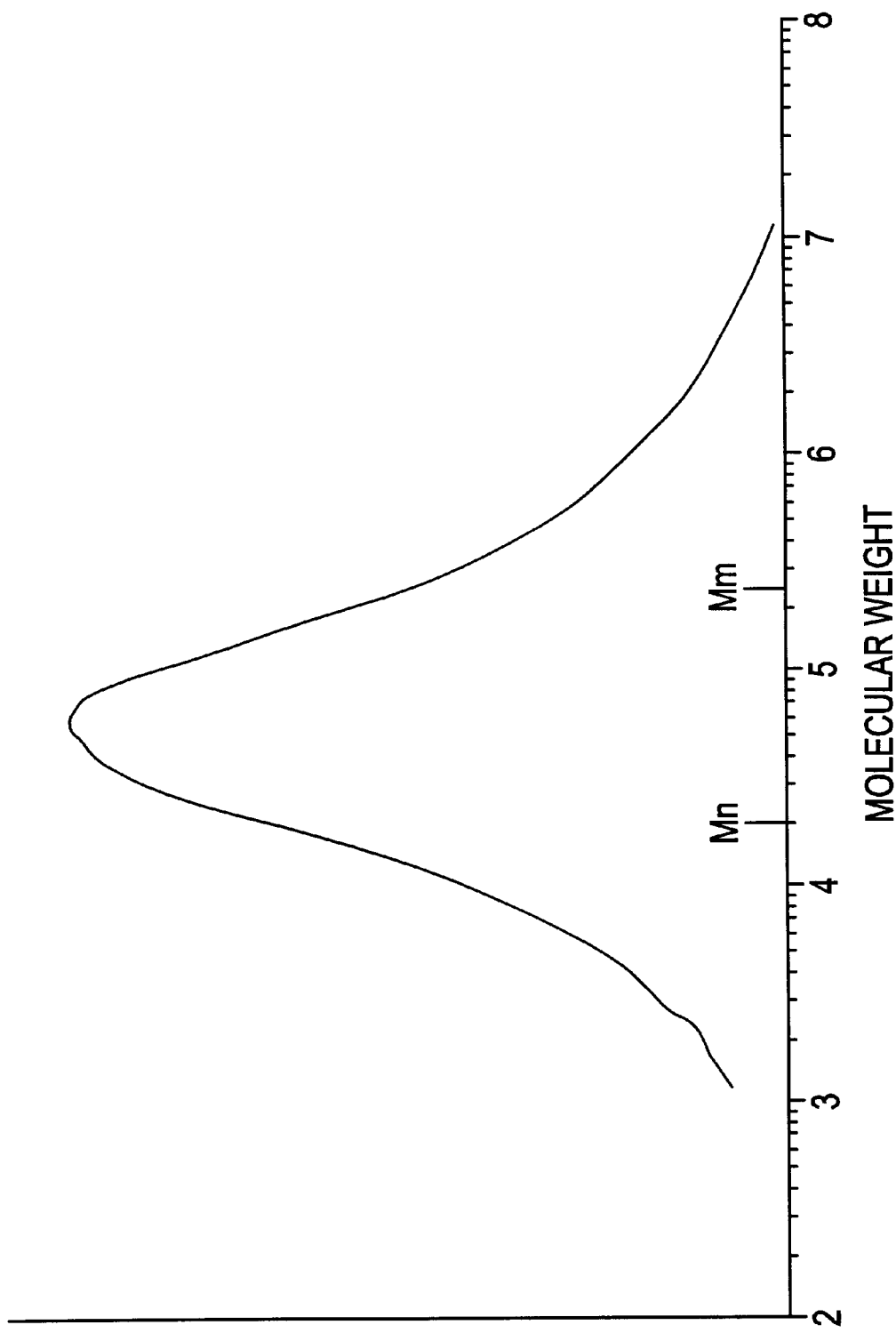

It may be seen from FIGS. 1 and 2 that the resin produced by catalyst A has a peak at a molecular weight value lower than that for the resin produced by catalyst B.

In accordance with the process of the invention, the two catalysts A and B, but without their respective co-catalysts as specified above, were combined and introduced into a single polymerisation reactor and were thereafter employed to produce a polyethylene resin copolymer under the conditions specified in Table 1. The properties of the resultant polyethylene resin are specified in Table 1. It may be seen that the resin had an HLMI of around 25 g/10 min and a density of around 0.947 g/cc. The gel phase chromatograph of the resin produced in accordance with Example 1 is illustrated in FIG. 3. It may be seen that curve A, which represents the molecular weight distribution of the polyethylene resin, is monomodal. Curves B and C represent the molecular weight distributions of the two fractions produced by catalysts A and B, these curves corresponding respectively to the curves shown in FIGS. 1 and 2. Lines D and E on FIG. 3 represent the comonomer distribution for each of curves B and C respectively. It may be seen that the comonomer distribution is higher for the higher molecular weight fraction than for the lower molecular weight fraction.

EXAMPLE 2

In this Example, the composite chromium-based catalyst comprised a mixture of a first chromium-based catalyst (catalyst C) which had been titanated in situ and a second chromium-based catalyst which had a higher degree of comonomer incorporation as a result of having a higher pore volume, having been fluorinated in situ and having been activated at a higher activation temperature. In a manner similar to that for Example 1, each of catalysts C and D, having the catalyst properties and activation conditions specified in Table 2, was individually employed to polymerise ethylene under conditions specified in Table 2 to yield a respective (the operating) polyethylene having the properties specified in Table 2. In addition, in accordance with Example 2, a composite catalyst comprising a mixture of catalysts C and D was employed to polymerise ethylene under the operating conditions specified in Table 2, to yield a polyethylene resin having the properties specified in Table 2.

The first catalyst, catalyst C, comprised a chromium-based catalyst on a silica support having relatively low pore volume and relatively low surface area whereas the second catalyst, catalyst D, also comprised a chromium-based catalyst on a silica support and had a relatively high pore volume and a relatively high surface area. The first catalyst, catalyst C, was subjected to titanation during which 4 wt % titanium was introduced into the catalyst by drying the catalyst to 300° C. then titanating the catalyst with titanium isopropoxide. Thereafter, the titanated catalyst was actuated by being held at a temperature of 650° C. in air for 6 hours. In contrast, the second catalyst, catalyst D, was simply subjected to activation in air at a temperature of 650° C.

In forming the mixture of catalysts C and D for Example 2, an amount of catalyst C was titanated to an amount of 4 wt % titanium in the manner specified above. Then, catalyst D was added and thereafter the composite catalyst was activated in air at a temperature of 650° C.

It will be seen from Table 2 that again the density of the resin produced using catalyst D is lower than that produced using catalyst C, indicating a higher degree of comonomer incorporation into the high molecular weight resin fraction produced by catalyst D.

TABLE 1

|  | Catalyst A | Catalyst B | Example 1 |
|---|---|---|---|
| CATALYST | CR/Al PO$_4$ | Cr/SiO$_2$—TiO$_2$ |  |
| Pore Volume (cc/g) | 1.0 | 2.3 |  |
| Surface Area (m$^2$/g) | 190 | 543 |  |
| P/Al Atomic Ratio | 0.68 | — |  |
| Ti (wt %) | — | 2.6 |  |
| Cr (wt %) | 1.0 | 1.0 |  |
| ACTIVATION CONDITIONS |  |  |  |
| Activation T(C. °) | 750 | 650 |  |
| Added Fluorine (wt %) | — | 1.4 |  |
| CO reduction T(C. °) | 850 | 370 |  |
| Reoxidation T(C. °) | 750 | — |  |
| OPERATING CONDITIONS |  |  |  |
| Polymerisation T(C. °) | 95 | 95 | 95 |
| C$_2$ (wt %) | 6 | 6 | 6 |
| C$_6$ (wt %) | 1.5 | 1.5 | 1.5 |
| Co-catalyst |  |  |  |
| Type | TEB | TEAL | — |
| ppm | 4 | 4 | — |
| POLYETHYLENE PROPERTIES |  |  |  |
| MI$_2$ (g/10′) | 5.6 | — | — |
| HLMI (g/10′) | — | 6.3 | 25 |
| Density (g/cc) | 0.9547 | 0.936 | 0.947 |
| Mn (kDa) | 8 | 19 | 11 |
| Mw (kDa) | 118 | 244 | 201 |
| Mz (kDa) | 2257 | 2465 | 2400 |
| D | 14.8 | 12.4 | 18 |

TABLE 2

|  | Catalyst C | Catalyst D | Example 2 |
|---|---|---|---|
| CATALYST | CR/SiO$_2$ | Cr/SiO$_2$ |  |
| Pore Volume (cc/g) | 1.5 | 3 |  |
| Surface Area (m$^2$/g) | 300 | 500 |  |
| Ti (wt %) | 4.0 | — |  |
| Cr (wt %) | 1.0 | 1.0 |  |
| ACTIVATION CONDITIONS |  |  |  |
| Activation T(C. °) | 650 | 650 |  |
| Added Fluorine (wt %) | — | — |  |
| CO reduction T(C. °) | — | — |  |
| Reoxidation T(C. °) | — | — |  |
| OPERATING CONDITIONS |  |  |  |
| Polymerisation T(C. °) | 100 | 100 | 100 |
| C$_2$ (wt %) | 6 | 6 | 6 |
| C$_6$ (wt %) | 0.2 | 0.2 | 0.2 |
| Co-catalyst |  |  |  |
| Type | — | — | — |
| ppm | — | — | — |
| POLYETHYLENE PROPERTIES |  |  |  |
| MI$_2$ (g/10′) | 0.5 | 0.05 | — |
| HLMI (g/10′) | 68.2 | 5.9 | 20 |
| Density (g/cc) | 0.955 | 0.944 | 0.950 |
| Mw (kDa) | 151 | 288 | 211 |
| D | 15.8 | 15.7 | 16 |

What is claimed is:

1. A process for producing a polyethylene resin having a monomodal molecular weight distribution in a single polymerization reactor using a chromium-based catalyst system, by copolymerizing ethylene and an alpha-olefinic-comonomer having from 3 to 8 carbon atoms, the polyethylene resin comprising a blend of a higher molecular weight fraction polymerized by a first chromium-based catalyst of the system and a lower molecular weight fraction polymerized by a second chromium-based catalyst of the system, wherein the comonomer incorporation in the higher molecular weight fraction is greater than the comonomer incorporation in the lower molecular weight fraction whereby the higher and lower molecular weight fractions differ in density by from 0.01 to 0.03 g/cc.

2. A process for producing a polyethylene resin having a monomodal molecular weight distribution in a single polymerization reactor using a chromium-based catalyst system, by copolymerizing ethylene and an alpha-olefinic-comonomer having from 3 to 8 carbon atoms, the polyethylene resin comprising a blend of a higher molecular weight fraction polymerized by a first chromium-based catalyst of the system and a lower molecular weight fraction polymerized by a second chromium-based catalyst of the system, wherein the comonomer incorporation in the higher molecular weight fraction is greater than the comonomer incorporation in the lower molecular weight fraction whereby the higher and lower molecular weight fractions differ in density by from 0.01 to 0.03 g/cc, wherein the first and second chromium-based catalysts comprise a common catalyst and at least one of the first or second chromium-based catalysts has been pretreated so as to vary the molecular weight distribution of the resin fraction produced by that catalyst with respect to the other catalyst.

3. A process according to claim 2 wherein the pre-treatment comprises fluorination.

4. A process according to claim 2 wherein the first and second chromium-based catalysts are physically blended prior to a common activation step.

5. A process according to claim 1 wherein the first and second chromium-based catalysts comprise different catalysts.

6. A process according to claim 5 wherein the first and second chromium-based catalysts include supports having different pore volumes.

7. A process according to claim 5 wherein at least one of the first and second chromium-based catalysts has been pre-treated so as to vary the molecular weight distribution of the resin fraction produced by that catalyst with respect to the other catalyst.

8. A process according to claim 7 wherein the first catalyst has been fluorinated in a pre-treatment step.

9. A process according to claim 7 wherein the second chromium-based catalyst has been titanated prior to activation.

10. A process according to claim 5 wherein the first and second chromium-based catalysts are physically blended prior to a common activation step.

11. A process according to claim 5 wherein the first and second chromium-based catalysts have supports having different chemical compositions.

12. A process according to claim 11 wherein the first chromium-based catalyst has a silica-containing support and a second chromium-based catalyst has a phosphate-containing support.

13. A process according to claim 12 wherein the silica-containing support has been fluorinated and chemically reduced after activation thereof.

14. A process according to claim 12 wherein the second chromium-based catalyst has been subjected to a chemical reduction and reoxidation process after activation thereof.

15. A process according to claim 1 wherein the comonomer is 1-hexene.

16. A process according to claim 1 wherein the polyethylene resin has a density of from 0.930 to 0.960 g/cc.

* * * * *